United States Patent [19]

Cobb

[11] Patent Number: 5,335,408
[45] Date of Patent: Aug. 9, 1994

[54] METHOD OF MAKING A WATER BLOCKED OPTICAL FIBER CABLE

[75] Inventor: Gary S. Cobb, Norcross, Ga.

[73] Assignee: AT&T Bell Laboratories, Murray Hill, N.J.

[21] Appl. No.: 21,822

[22] Filed: Feb. 24, 1993

Related U.S. Application Data

[63] Continuation of Ser. No. 443,300, Nov. 29, 1989, Pat. No. 5,217,808.

[51] Int. Cl.$^5$ .............................................. H01B 13/06
[52] U.S. Cl. .................................. 29/447; 29/458; 156/52; 156/49; 156/86
[58] Field of Search ................ 156/49, 52, 53, 56, 156/84, 86, 85, 51; 385/100; 439/523, 730; 29/859, 516, 517, 447, 458

[56] References Cited

U.S. PATENT DOCUMENTS

| | | | |
|---|---|---|---|
| 3,667,783 | 6/1972 | Sotolongo | 285/161 |
| 3,880,453 | 4/1975 | Philibert et al. | 285/161 |
| 3,891,294 | 6/1975 | Philibert | 439/462 |
| 4,030,741 | 6/1977 | Fidrych | 285/161 |
| 4,145,565 | 3/1979 | Weingartner | 174/28 |
| 4,224,464 | 9/1980 | Bunnell et al. | 174/65 R |
| 4,241,234 | 12/1980 | Haeder | 174/92 |
| 4,371,172 | 2/1983 | de Vienne | 277/12 |
| 4,376,873 | 3/1983 | Lackinger | 174/65 SS |
| 4,431,861 | 2/1984 | Clabburn et al. | 156/86 X |
| 4,450,318 | 5/1984 | Scardina et al. | 156/86 X |
| 4,549,038 | 10/1985 | Masheris et al. | 174/65 SS |
| 4,703,997 | 11/1987 | Ijiri et al. | 385/109 |
| 4,711,523 | 12/1987 | Iri et al. | 385/109 |
| 4,717,608 | 1/1988 | Meltsch | 428/35.1 |
| 4,738,504 | 4/1988 | Jones | 385/86 |
| 4,740,054 | 4/1988 | Becker et al. | 385/105 |
| 4,755,241 | 7/1988 | Steinberg | 156/49 X |
| 4,767,184 | 8/1988 | Ogasawara et al. | 385/105 |
| 4,772,212 | 9/1988 | Sotolongo | 439/98 |
| 4,812,014 | 3/1989 | Sawano et al. | 385/13 |
| 4,844,575 | 7/1989 | Kinard et al. | 385/113 |
| 4,867,526 | 9/1989 | Arroyo | 385/107 |
| 4,909,592 | 3/1990 | Arroyo et al. | 385/113 |
| 4,950,343 | 8/1990 | Shimirak et al. | 156/52 |
| 4,997,689 | 3/1991 | Langen et al. | 428/34.9 |
| 5,066,095 | 11/1991 | Dekeyser et al. | 385/99 |
| 5,071,221 | 12/1991 | Fujitani et al. | 385/100 |

FOREIGN PATENT DOCUMENTS 0314991 10/1989 European Pat. Off. .
1177915 1/1970 United Kingdom .

OTHER PUBLICATIONS

Raychem brochure entitled "FOSC 100 TM Fiber Optical Splice Closure System" Article Fiber-To-The-Home Update: Drop Installation Flexibility authored by G. S. Cobb, et al. published in the proceedings of the 1989 Int'l. Wire and Cable Symposium held in Atlanta Nov. 14–16, 1989.

*Primary Examiner*—Michael W. Ball
*Assistant Examiner*—Francis J. Lorin
*Attorney, Agent, or Firm*—Donald E. Hayes, Jr.

[57] ABSTRACT

An optical cable portion (10), resident within a cable closure (14), is caused to receive a water blocking arrangement which is effective to prevent water, which enters an internal cable portion (24) through an unintended cut (21) in an outer jacket (18) of a cable portion (20), from entering an interior of the cable closure. A plurality of water blocking materials (30 and 32) are coaxially disposed about the outer jacket and a core tube (26) of the cable portion, respectively, and cooperate with a heat shrinkable plastic tube (34) which substantially covers the water blocking materials to prevent the movement of water from the internal cable portion past the water blocking materials.

9 Claims, 4 Drawing Sheets

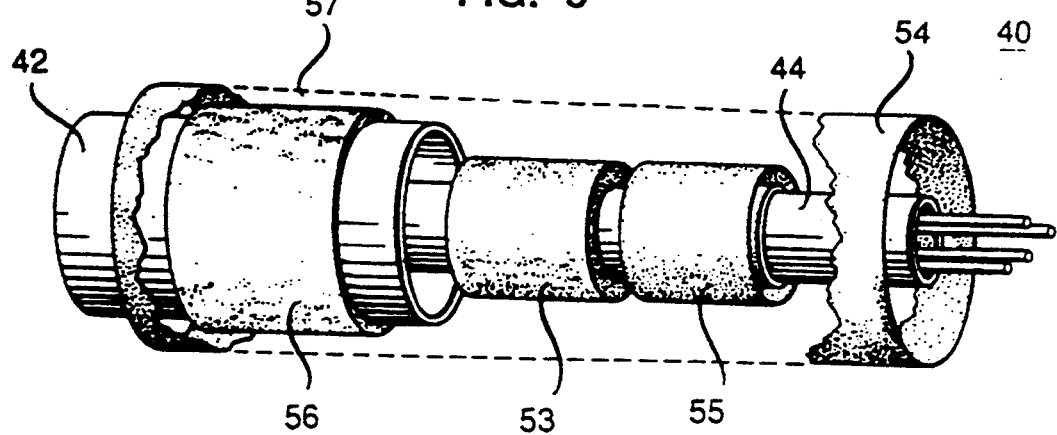
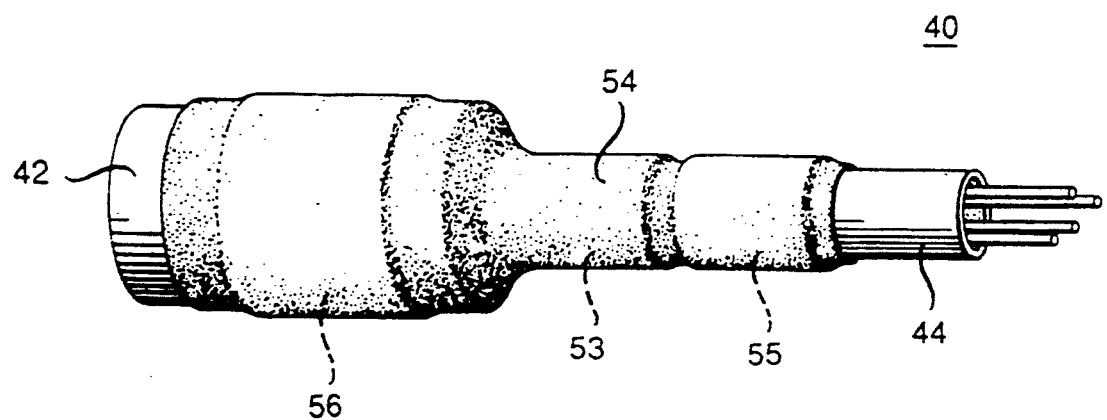

METHOD OF MAKING A WATER BLOCKED OPTICAL FIBER CABLE

This is a continuation of application Ser. No. 07/443,300 filed Nov. 29, 1989 now U.S. Pat. No. 5,217,808.

TECHNICAL FIELD

This invention relates to a water blocked cable portion and methods of making same. More particularly, it relates to methods effective to prevent the flow of water resident within adjacent layers of an optical fiber cable structure out of a portion of the optical fiber cable.

BACKGROUND OF THE INVENTION

A well known optical fiber cable design comprises a core which comprises at least one coated optical fiber, a longitudinally extending core tube in which the core is disposed and a sheath system which includes an outer jacket longitudinally disposed about the tube. The optical fiber cable often includes, additionally, strength members disposed between the core tube and an outer surface of the outer jacket.

Optical fiber cables and associated apparatus such as a cable closure, for example, are typically designed and manufactured to avoid problems which may be caused by a variety of anticipated environmental conditions to which the cable and associated apparatus will be exposed. One such condition is the exposure of portions of the cable and the cable closure to water. Potential problems associated with this condition are the entry of water into internal portions of the cable as well as the entry of water into the cable closure in which the cable has been terminated, spliced or branched.

The entry of water into a cable closure is an undesirable condition because water generally has a detrimental effect on the enclosed optical fiber cable, the optical fiber and internal portions of the cable closure. For example, water vapor may attack surface flaws of the external surface of the glass optical fiber and cause stress corrosion. In the presence of water and stress in the optical fiber, a surface flaw in the optical fiber will tend to grow in size, causing a reduction in the surface area over which the stress in the fiber is distributed. This may result in lower tensile stress fiber breaks. Another detrimental effect resulting from the presence of water in a closure may be the influence of the water's freezing. The freezing of water may subject the fiber and internal portions of the cable and closure to damaging mechanical loads.

Sealing an optical fiber cable closure to prevent the ingress of water depends, generally, on effecting three different seals. A first seal necessary to properly seal a closure is a seal formed between a portion of an outer surface of an outer jacket of the cable and a surface of the closure or a surface that is independently sealable with the cable closure. This may be accomplished by various means including gland packing fittings wherein a pliable gland is caused to be compressed into sealing engagement with a portion of the outer surface of the cable jacket and a portion of a surface of the gland packing fitting. This first seal is effective to prevent the ingress of water between a portion of the outer surface of the outer jacket and the cable closure.

A second cable closure seal necessary to prevent the ingress of water into a cable closure is a seal associated with a closure cover. The cover is caused to seal with, for example, a closure bulkhead portion through which cables extend into the closure by means that include lip seals, "O" rings, gaskets or gel-like sealant materials.

A third seal necessary to prevent the ingress of water into a cable closure is a seal disposed about an end portion of the cable which is disposed within the cable closure. This seal needs to be effective to prevent water that enters interior portions of the cable at a point outside the cable closure from traveling along the length of the cable between adjacent cable sheath components. A cable end portion that includes this third seal is said to be water blocked. It is this third type of seal which is addressed by this invention.

Water may have an occasion to enter the core tube through a cut in the cable which extends through the outer jacket and the core tube. Because the core tube communicates with an interior portion of the cable closure in which an open end of the core tube is disposed, water traveling along an interior portion of the core tube could enter the cable closure.

An annular gap between adjacent layers of the internal cable structure may also act as a conduit through which water may travel to enter the cable closure. Water may enter a portion of the internal cable structure through an unintended cut or puncture in the outer jacket of the cable and travel longitudinally within the cable.

Water blocking compounds such as, for example, a jelly-like material are often disposed within the core tube and are effective to prevent substantially the entry of water therein, as well as to prevent water that does in fact enter the core tube from traversing longitudinally along the interior portion thereof. Means such as water blocking tapes, as disclosed in C. J. Arroyo U.S. Pat. No. 4,867,526, are effective to arrest the migration of water within portions of the cable structure.

The efficacy of such water blocking means is measured as an ability of it to prevent an absolute flow of water over a specified length of the cable at a specified liquid head pressure for a given period of time. Cable industry standards for flow of fluids within a cable have been promulgated and have set forth standard test conditions, equipment, procedures and failure criteria. One such standard is promulgated by the Electronic Industries Association A 455-82, and is entitled, Fluid Penetration Test For Filled Fiber Optic Cable. Standard test conditions set forth in A 455-82 include an applied fluid head of $1.0 \pm 0.1$ meter of water, factory atmospheric temperature and pressure, and a test sample length of cable of $1.0 \pm 0.1$ meter. Pursuant to the test procedure, water is caused to be introduced into an end of the test cable, the pressure of which is maintained at 1 meter of static water head for a period of one hour. Any evidence of water leaking from another end of the cable is sufficient to fail the test cable.

What is important to realize is that in a case where a cable is terminated inside a cable closure, water can enter the closure by way of a path within the cable even though the cable otherwise passes the fluid penetration tests described above. Water entering through a cut or puncture in the outer jacket of the cable may be able to enter the closure in which the cable is terminated if the cut or puncture is located at a distance from the closure less than the test length of the above stated test, that is, 1.0 meter. Therefore, means must be provided to prevent the ingress of water into a cable closure via internal cable paths other than an internal portion of the core tube of an optical fiber cable.

One method of preventing the ingress of water into a closure utilizes a potting compound. Here, a closure may include two sections defined by two bulkheads with cable sealing grommets through which cables extend and a closure cover which is tubular and which has a closed end and an open end. A cable end portion is extended through a first bulkhead and cable sealing grommet. Portions of the cable are removed, that is, all of the cable sheath components including an outer jacket, strength members and other intermediate members disposed about the core tube, so that only an end portion of the core tube extends from the cable end portion. The core tube is caused to be extended through a second bulkhead spaced from the first bulkhead and a sealing grommet. The cable portion is positioned such that the end portion of the cable comprising the outer jacket and other sheath components and an adjacent, relatively short length of the core tube are caused to be disposed within a first chamber of the closure defined by the first and second bulkheads and a portion of an interior surface of the closure cover. The core tube is caused to communicate with a second chamber which is defined by the second bulkhead and an end portion of the closure cover and which is opposite the first chamber.

In a closure in which potting compounds are used to effect water blocking of the cable sheath, splices are typically located in the second chamber. The water blocking of the cable end portion against the flow of water through portions of the cable sheath components into the cable closure occurs in the first chamber. The closure cover is fastened securely and the first chamber is caused to receive a liquid potting compound. The compound is allowed to cure, thus forming a solid potting compound. The solid, cured potting compound is effective to prevent water from entering the cable closure through portions of the cable sheath components.

The just-described cable water blocking arrangement is most practical when frequent access to the interior of the cable closure is not anticipated. Reentry into the closure would most often occur if a new cable were being spliced or connected to another cable within an in-use closure. To effect the introduction of a new cable into the closure, at least a portion of the cured potting material within the closure would have to be removed. The first chamber of the closure is re-potted after a portion of the new cable is introduced to reestablish the closure water blocking capability. The removal of cured potting material and the installation of new potting material is an expensive, time consuming and labor intensive process.

What is needed and what does not appear to be provided in the prior art is an arrangement for causing a cable portion such as an end portion which is located within a closure to be water blocked in a way that is inexpensive, does not require the use of potting materials and allows reentry of the closure without destroying the water blocking seal of other, previously installed cables.

SUMMARY OF THE INVENTION

The foregoing problems of providing cable water blocking for a portion of a cable which extends into a closure have been solved by the arrangements and methods of this invention.

A cable destined to be terminated in a cable closure is caused to be water blocked to prevent the ingress of water into the cable closure after the closure is put into use. End portions of a cable sheath system are first removed so as to expose an end portion of a core tube of the cable in which is disposed at least one transmission medium. A water blocking material, for example, a water blocking tape is first wrapped around an outer surface of an outer jacket of the cable adjacent to the exposed core tube. A second water blocking material, for example a water blocking tape, is caused to be wrapped around an outer surface of a portion of the core tube adjacent to the first water blocking material.

A plastic membrane such as a heat shrinkable plastic tube is cut to a length sufficient to at least partially cover at least portions of both water blocking tapes when the heat shrinkable plastic tube is disposed about the end portion of the cable. In one embodiment, the heat shrinkable tube is disposed about the cable end portion so that the water blocking materials are completely or substantially covered. Heat energy is applied to the heat shrinkable material to cause shrinking of the heat shrinkable tube. The shrinking of the tube causes a portion of an inner surface of the heat shrinkable plastic tube to come into compressive engagement with the water blocking materials disposed about the core tube and the outer jacket. The compressive engagement of the heat shrinkable plastic tube with the water blocking materials is effective to provide a water blocking seal between a portion of an inner surface of the heat shrinkable plastic tube and the outer surface of the core tube and between a portion of an inner surface of the heat shrinkable plastic tube and a portion of the outer surface of the outer jacket.

Advantageously, the water blocking method of this invention is accomplished quickly and inexpensively and does not require the use of potting materials. Other cables may be added to or removed from the cable closure without interfering with the water blocking of cables water blocked by the methods of this invention.

BRIEF DESCRIPTION OF THE DRAWING

Other features of the present invention will be more readily understood from the following detailed description of specific embodiments thereof when read in conjunction with the accompanying drawings, in which:

FIG. 5 is a perspective of a cable end portion with a second alternative water blocking arrangement in a partially completed stage;

FIG. 6 is a perspective view of the cable end portion shown in FIG. 5 with the water blocking arrangement being complete;

DETAILED DESCRIPTION

Figure 1:
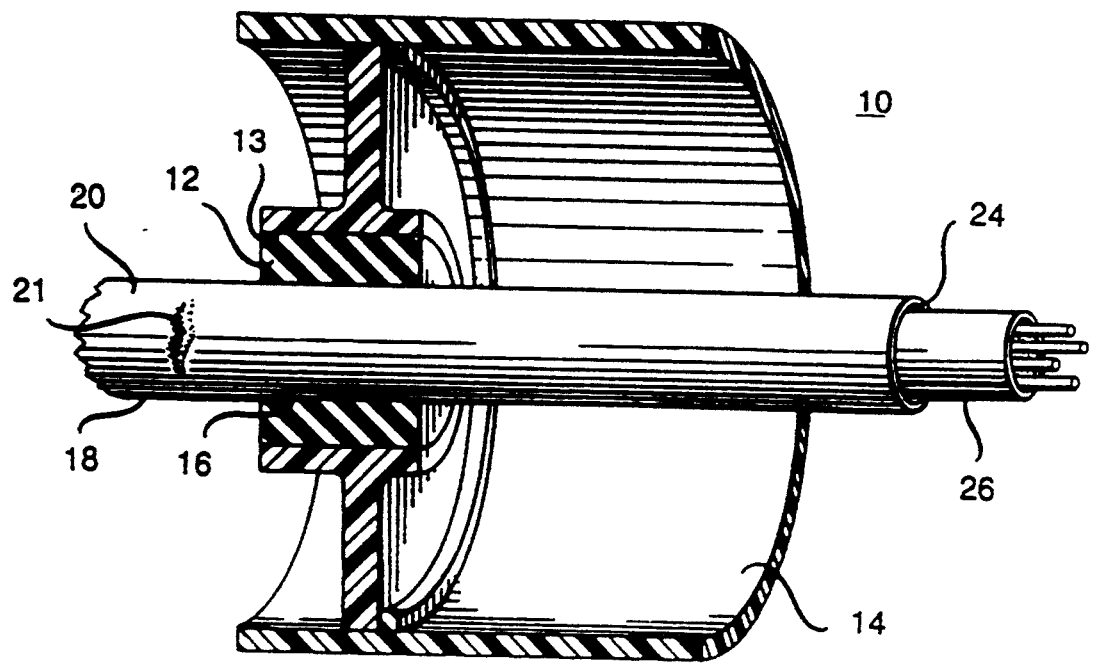
FIG. 1 is a perspective view of a cable end portion disposed within a portion of a cable closure.

Referring now to FIG. 1 there is shown a portion of an optical fiber cable and more specifically an end portion of an optical fiber cable designated generally by the numeral 10 extending through a grommet 12 which is in sealing and gripping engagement with a surface that defines a cable entry aperture 13 of a cable closure 14 and an outer surface 16 of an outer jacket of the cable end portion 10. The sealing and gripping engagement of the grommet 12 with the surface that defines the cable entry aperture 13 and the outer jacket 18 is effective to prevent the ingress of water into the cable closure 14 adjacent to the outer jacket of the cable end portion 10.

A portion 20 of the cable end portion 10 which is external to the closure 14 is shown having a cut 21 in a portion of the outer jacket 18. If the portion 20 having the cut 21 is exposed to water, water may enter an internal portion 24 of the cable end portion 10 which is an annulus defined by an internal surface of the outer jacket 18 and an outer surface of a core tube 26. The annulus 24 may act as a conduit which may direct the flow of water entering through the cut 21 into the cable closure 14.

Figure 2:
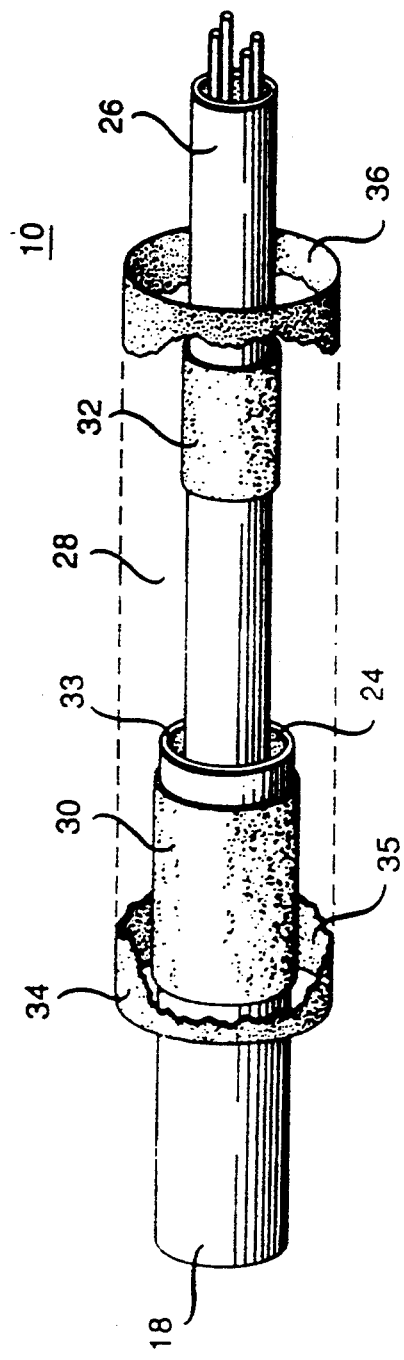
FIG. 2 is a perspective view of a cable end portion with a water blocking arrangement being partially completed.

A partially completed arrangement of a water blocked cable portion of the disclosed invention is shown in FIG. 2. There is shown in FIG. 2 the cable end portion 10, which is disposed wholly within the cable closure 14 of FIG. 1, with a predetermined length of the outer jacket 18 removed therefrom to expose a portion 28 of the core tube 26. A first water blocking material 30, which in a preferred embodiment may be a predetermined length of a water blocking tape, is wrapped spirally about an outer surface of a portion of the outer jacket 18 adjacent to the exposed portion 28 of the core tube 26. A second water blocking material 32, which may be a water blocking tape, is wrapped spirally about an outer surface of the core tube 26 adjacent to a peripheral end surface 33 of the outer jacket 18. Water blocking tapes are disclosed in hereinbefore mentioned C. J. Arroyo U.S. Pat. No. 4,867,526, which is incorporated by reference hereto.

In an alternative embodiment, the first water blocking material 30 is a low viscosity polyurethane polymer material applied circumferentially and in uniform thickness about a portion of the outer jacket 18. Also, the second water blocking material 32 may alternatively be a low viscosity polyurethane polymer material applied circumferentially and in uniform thickness about a portion of the core tube 26.

In the first embodiment depicted in FIG. 2, a predetermined length of a heat shrinkable plastic tube 34, that is, a plastic tube which when subjected to heat energy deforms by shrinking and in some cases shrinks preferentially in a particular dimension, is disposed about the cable end portion 10 such that both water blocking materials are substantially covered by the heat shrinkable plastic tube. In the preferred embodiment, shown in FIG. 2, the heat shrinkable plastic tube 34 extends slightly beyond the water blocking materials 30 and 32.

Figure 3:
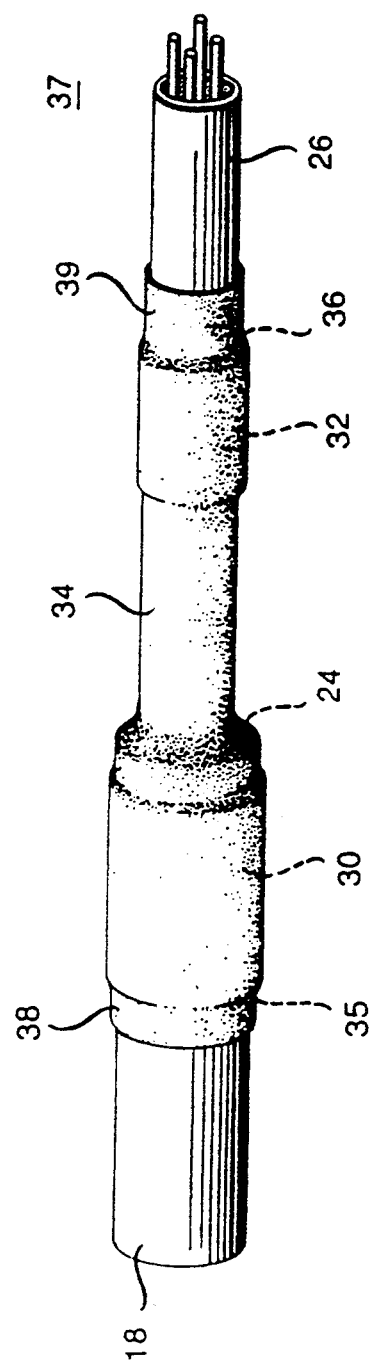
FIG. 3 is a perspective view of the cable end portion shown in FIG. 2 with the water blocking arrangement being complete.

Heat energy is applied uniformly to the heat shrinkable plastic tube 34 and is effective to cause the heat shrinkable plastic tube to shrink substantially in circumference. The heat shrinkable plastic tube 34 is caused to become disposed in compressive engagement with the water blocking materials 30 and 32 and other portions of the cable end portion 10 which are covered by the heat shrinkable plastic tube 34 as shown in FIG. 3. An annulus 35 is defined by an interior portion of the heat shrinkable plastic tube 34 and a portion of the outer jacket 18 and within which is disposed the water blocking material 30. An annulus 36 is defined by an interior portion of a heat shrinkable plastic tube 34 and a portion of the core tube 26 and within which is disposed the water blocking material 32.

In FIG. 3 there is shown a water blocked cable end portion generally designated by the numeral 37. The cooperation of the heat shrinkable plastic tube 34 with the water blocking materials 30 and 32 together with the outer jacket 18 and the core tube 26, respectively, is effective to prevent the movement of water from the annulus 24 (see FIG. 2) past the water blocking materials 30 and 32. If water engages the water blocking materials 30 or 32, which may comprise an acrylate polymer, for example, the water is absorbed and may become gel-like which is effective to cause sealing of the annuli 35 and 36 within which the water blocking materials are disposed. Also, swelling of the water blocking material within the annuli enhances the water blocking of the cable end portion 37. Portions 38 and 39 of the heat shrinkable plastic tube 34, which are in compressive engagement with the outer jacket 18 and the core tube 26, respectively, are effective to prevent water pressure from causing the water blocking tapes 30 and 32 to be moved from their positions between the heat shrinkable plastic tube 34 and the outer jacket 18 and the core tube 26, respectively, and also enhance the mechanical integrity of the water blocked cable end portion 37.

Heat shrinkable plastic tube material is often characterized by a ratio of its original, unshrunken diameter to a minimum diameter to which it will shrink upon exposure to heat energy. This may be referred to as a shrink-down ratio. In the preferred embodiment (see FIG. 3) the heat shrinkable plastic tube 34 shrinks into sealing engagement with the water blocking material 30 disposed about the outer jacket 18 and the water blocking material 32 disposed about the core tube 26 as well as a portion of the outer jacket 18 adjacent to the portion 38 of the heat shrinkable plastic tube 34 and a portion of the core tube 26 adjacent to the portion 39 of the heat shrinkable plastic tube 34. However, heat shrinkable plastic tubing with an original diameter and a shrink-down ratio sufficient to accommodate some sizes and ratios of outer jacket outside diameters and core tube outer diameters may not be available commercially. In such a situation, a specially molded heat shrinkable plastic tube may be required or other steps taken to overcome this disparity in dimensions.

Figure 4:
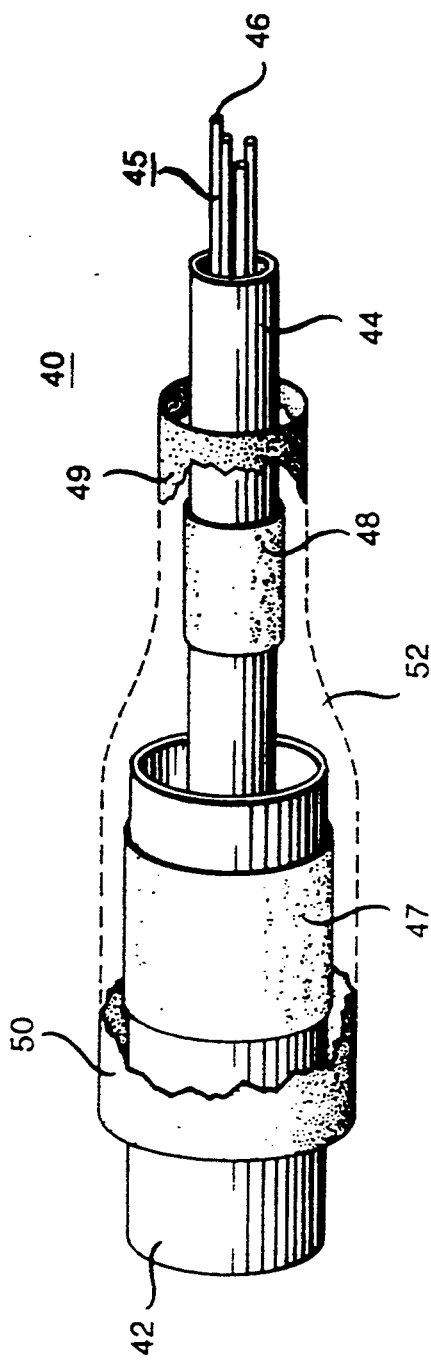
FIG. 4 is a perspective view of a cable end portion with a first alternative embodiment water blocking arrangement being partially complete.

Looking now at FIG. 4, there is shown a cable end portion 40 comprising an outer jacket 42, a core tube 44 and an optical fiber core 45 comprising at least one optical fiber 46. It may be observed that the ratio of the outer diameter of the outer jacket 42 to the outer diameter of the core tube 44 is greater than a similar ratio of the cable end portion 10 shown in FIG. 2, for example. The outer jacket-to-core tube ratio of the cable end portion 40 of FIG. 4 may be such that there is not a size of heat shrinkable plastic tube conveniently and economically available which has the original diameter and the shrink-down ratio necessary to cause the heat shrinkable plastic tube to shrink into compressive engagement with a plurality of water blocking tapes 47 and 48 which are disposed about the outer jacket 42 and the core tube 44, respectively.

An arrangement to overcome the problem of a high ratio of a cable outer jacket diameter to the cable core tube diameter includes a specially fabricated heat shrinkable plastic tube 49 wherein a first end portion 50 of the specially fabricated heat shrinkable plastic tube has a diameter sized to accomodate, for example, the outer jacket 42 of cable end portion 40 with the water blocking tape 47 disposed thereabout. A second end portion 51 of the specially fabricated heat shrinkable plastic tube has a diameter sized to accomodate the core tube 44 with the water blocking tape 48 disposed thereabout. The engagement of an interior portion of the second end portion 51 with the core tube 44 is effective to prevent water pressure from causing the water blocking tape 48 to be moved from engagement between the heat shrinkable plastic tube and the core tube. A converging portion 52 of the specially fabricated heat shrinkable tube is disposed between the first and second end portions 50 and 51, respectively, of the specially fabricated heat shrinkable plastic tube. The specially fabricated heat shrinkable plastic tube 49 is capable of shrinking into sufficient compressive engagement with the cable end portion 40 to provide water blocking upon application of heat energy. It is believed, however, that this arrangement is less flexible and more expensive than an alternative arrangement, the description of which follows.

An alternative arrangement for water blocking the cable end portion 40 in which the outer diameter of an outer jacket is substantially larger than the diameter of a core tube is shown in FIG. 5. In a preferred embodiment, shown in FIG. 5, a strip of water blocking tape 53, is wrapped spirally about the core tube 44 and is of sufficient length to provide an overall diameter which will accomodate the shrink-down ratio of a heat shrinkable plastic tube 54 which has a relatively uniform unshrunken diameter, unlike that of the heat shrinkable plastic tube 49 as shown in FIG. 4 and discussed hereinbefore. Also, an effective diameter of a portion of the core tube 44, relative to the actual diameter of the core tube, is caused to be increased by the installation of one or more relatively short lengths of a second heat shrinkable plastic tube 55. An outer effective diameter of the core tube 44 is caused to be sufficiently large to allow the heat shrinkable plastic tube 54 to shrink into engagement with an outer surface of the outermost second heat shrinkable plastic tube 55. The engagement of the heat shrinkable plastic tube 54 with the outer surface of the outermost heat shrinkable plastic tube 55 is effective to prevent water pressure from causing the water blocking tape 53 to be moved from its position between the core tube 44 and an interior portion of the heat shrinkable plastic tube 54. A second water blocking tape 56 is disposed about an end portion 57 of the outer jacket 42 adjacent to an exposed portion of the core tube 44. The heat shrinkable plastic tube 54 is caused to be disposed about the cable end portion 40 such that the heat shrinkable plastic tube 54 covers substantially the water blocking tapes 53 and 56 and the second heat shrinkable plastic tube 55. In a preferred embodiment, the heat shrinkable plastic tube 54 extends slightly beyond the water blocking tape 56 and the second heat shrinkable plastic tube 55. Heat energy is applied to the heat shrinkable plastic tube 54 to complete the water blocking arrangment as shown in FIG. 6.

Figure 7:
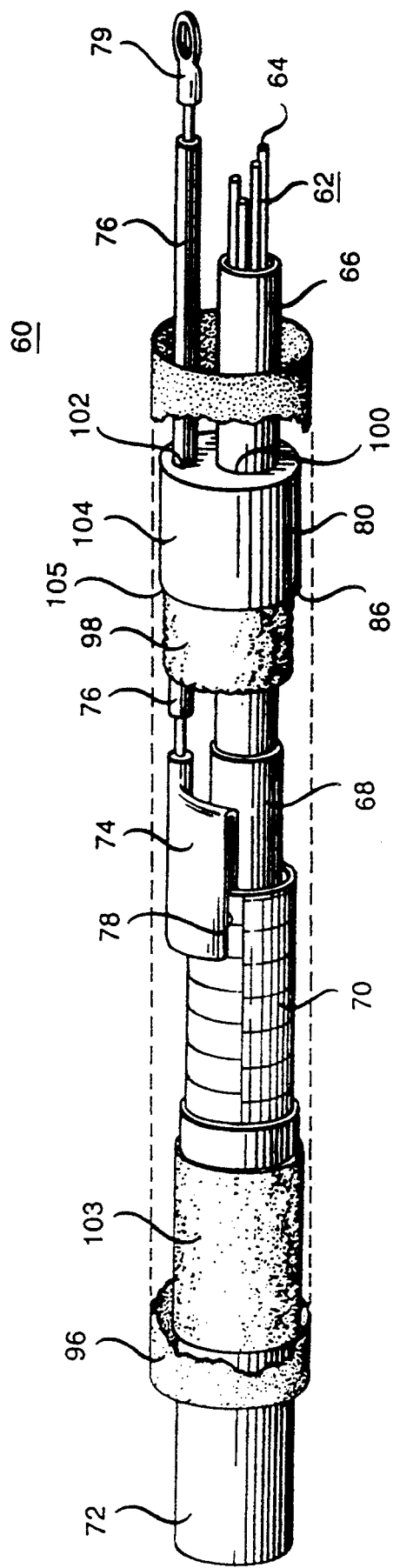
FIG. 7 is a perspective view of an end portion of a cable having a metallic shield with a water blocking arrangement of the end portion being partially completed.

The methods of this invention may be used to provide water blocking capabilities for end portions of cable structures other than those thus far described. Optical fiber cables are often manufactured with a metallic shield member which provides lightning and/or rodent protection for the cable structure. The metallic shield is typically coaxially disposed about other internal sheath structures and extends longitudinally within the cable. In FIG. 7 there is shown a cable end portion generally designated by the numeral 60. The cable end portion 60 comprises an optical fiber core 62 which comprises at least one optical fiber 64, a core tube 66 in which the optical fiber core 62 is disposed, a longitudinally extending inner jacket 68 coaxially disposed about the core tube 66, a metallic shield 70 disposed about the inner jacket 68 and being effective to provide lightning protection and a longitudinally extending outer jacket 72 coaxially disposed about the metallic shield 70. A metallic shield grounding clip 74 with an attached grounding wire 76 is caused to be disposed in conductive engagement with the metallic shield 70 by a mechanical engagement of a gripping portion 78 of the grounding clip 74. An end portion of the grounding wire 76 opposite an end portion of the grounding wire attached to the grounding clip 74, is terminated by a grounding lug 79 which is connected to a ground source to cause electrical grounding of the metallic shield 70. The grounding wire 76 is caused to extend substantially parallel to the core tube 66. Because the grounding wire 76 and core tube 66 are substantially parallel, providing water blocking for the cable end portion 60 requires an arrangement that differs from those heretofore described.

Figure 8:
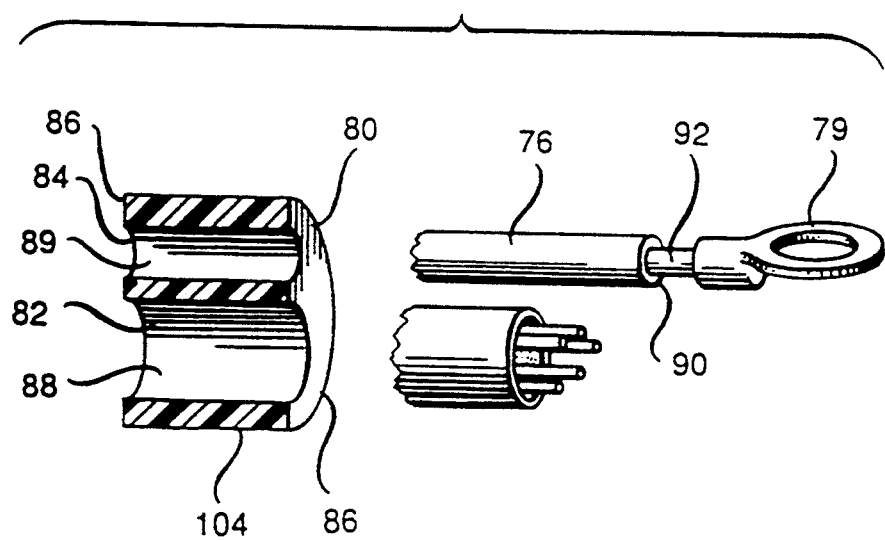
FIG. 8 is a perspective view of a portion of a sealing dam used to effect water blocking of the cable end portion of FIG. 7.

To effect water blocking of the cable end portion 60 with the grounding wire 76 attached to the metallic shield 70, the core tube 66 and the grounding wire 76 are caused to be extended through a water blocking dam 80. In a preferred embodiment (see FIGS. 7 and 8), the water blocking dam 80 comprises a disc-shaped material of a predetermined diameter and thickness. For example, the diameter may be sized to match closely the outer diameter of the outer jacket 72 of the cable end portion 60 and the thickness may be expressed in terms of the outer diameter of the water blocking dam 80.

A plurality of apertures 82 and 84 (see FIG. 8) extend through the water blocking dam 80, an axis of each aperture being perpendicular to a plurality of surfaces 86–86 which define opposite ends of the water blocking dam. A diameter of the aperture 82 is sized to cause a locational clearance fit between an outer surface of the core tube 66 and a surface 88 which defines the aperture 82. A diameter of the aperture 84 is sized to cause a locational clearance fit between a surface 89 which defines the aperture 84 and a portion of an insulation 90 disposed about a metallic portion 92 of the grounding wire 76.

Prior to disposing a heat shrinkable plastic tube 96 about the cable end portion 60, a first water blocking seal is provided by an application of a cured, low modulus polyurethane material 98, for example, Sealathane ® polyurethane polymer material manufactered by the Dexter Corporation, Seabrook, N.H., to the end surface 86 of the dam 80 which is adjacent to the metallic shield 70. The polyurethane material 98 applied to the end surface 86 is effective to enter an annulus 100 defined by the surface 88 of the aperture 82 and an adjacent portion of the outer surface of the core tube 66 and an annulus 102 defined by the surface 89 of the aperture 84 and an adjacent portion of the insulation 90 of the grounding wire 76. Rheological properties of the polyurethane material 98 and tolerance characteristics of the locational clearance fits of the core tube 66 with the aperture 82 and of the outer surface of the insulation 90 of the grounding wire 76 and the aperture 84 cooperate to allow the occlusion of the annuli 100 and 102, respectively.

After the polyurethane material 98 has been applied to the end surface 86 of the dam 80 the heat shrinkable plastic tube 96 is caused to be disposed about the cable end portion 60. In a preferred embodiment, an end portion of the heat shrinkable plastic tube 96 covers completely a water blocking tape 103 which is disposed about a portion of the outer jacket 72 adjacent to the metallic shield 70 and also extends to cover partially a portion of the outer jacket 72 adjacent to the water blocking tape 103 and opposite the metallic shield. Another end portion of the heat shrinkable plastic tube 96 is caused to be disposed about the dam 80 and in a preferred embodiment covers completely and extends slightly past the dam. The heat shrinkable plastic tube 96 is caused to be shrunken into engagement with the end portion 60 by an application of heat energy to the heat shrinkable plastic tube. The shrinking of the heat shrinkable plastic tube 96 about the cable end portion 60 is effective to cause compressive engagement of a portion of an inner surface of the heat shrinkable plastic tube and a portion of the outer jacket 72 with the water blocking tape 103 disposed therebetween thus effecting a water blocking seal. Also, the shrunken heat shrinkable plastic tube 96 is effective to cause a portion of the inner surface of the heat shrinkable plastic tube to come into compressive and gripping engagement with the surface 104 of the dam 80.

A fillet 105 formed between the end surface 86 of the dam 80 adjacent to the metallic shield 70 and an adjacent portion of the interior surface of the heat shrinkable plastic tube 96 is caused to be sealed by a movement of portions of the polyurethane material 98 into the fillet.

It is to be understood that the above-described arrangements are simply illustrative of the invention. Other arrangements may be devised by those skilled in the art which will embody the principles of the invention and fall within the spirit and scope thereof.

I claim:

1. A method of causing a portion of an optical fiber cable to be water blocked, said method comprising the steps of:
   providing an optical fiber cable comprising at least one optical fiber, a longitudinally extending core tube within which the optical fiber is disposed and a longitudinally extending outer jacket disposed about the core tube;
   removing the outer jacket from a portion of the cable, the removal of the outer jacket being effective to expose a portion of the core tube;
   causing a first water blocking material to be disposed about an outer surface of a portion of the outer jacket adjacent to the exposed portion of the core tube;
   causing a second water blocking material to be disposed about an outer surface of a portion of the core tube adjacent to the outer jacket;
   causing a heat shrinkable plastic tube to be disposed about the portion of the cable and to extend to cover at least a portion of the first water blocking material disposed about the outer jacket of the cable and at least a portion the second water blocking material disposed about the portion of the core tube; and
   applying heat energy to the heat shrinkable plastic tube, said step of applying heat energy being effective to cause the heat shrinkable plastic tube to shrink to cause compressive engagement of a portion of the inner surface of the heat shrinkable plastic tube with the water blocking materials and to provide a seal between a portion of the inner surface of the heat shrinkable plastic tube and a portion of the outer surface of the outer jacket of the cable and between a portion of the inner surface of the heat shrinkable plastic tube and a portion of an outer surface of the core tube.

2. The method of claim 1, wherein the heat shrinkable plastic tube is caused to extend to cover completely and extend past the first water blocking material disposed about the outer jacket of the cable and the second water blocking material disposed about the portion of the core tube.

3. The method of claim 2, wherein the step of applying heat energy to the heat shrinkable plastic tube is effective to cause a portion of the inner surface of the heat shrinkable plastic tube to become disposed in sealing and gripping engagement with a portion of the outer surface of the core tube and a portion of the outer surface of the outer jacket.

4. The method of claim 1, wherein said heat shrinkable plastic tube is a first heat shrinkable plastic tube and wherein said method further includes the steps of causing at least one relatively short length of a second heat shrinkable plastic tube to become disposed about a portion of the core tube which is spaced axially and distally from the second water blocking material, such that the second water blocking material is disposed between the second heat shrinkable plastic tube and the outer jacket and causing the second heat shrinkable plastic tube to be shrunk into sealing and gripping engagement with the core tube by the application of heat energy.

5. The method of claim 4, wherein the first heat shrinkable plastic tube is caused to extend to cover at least a portion of the second heat shrinkable plastic tube and at least a portion of said first water blocking material.

6. The method of claim 5 wherein heat energy is applied to the first heat shrinkable plastic tube and is effective to cause the first heat shrinkable plastic tube to come into compressive engagement with at least a portion of the second heat shrinkable plastic tube, with at least a portion of the first water blocking material, and with the second water blocking material.

7. The method of claim 1, wherein the second water blocking material comprises a disc through which the core tube extends.

8. The method of claim 7, wherein said method further includes the step of causing a water blocking polyurethane material to become disposed in engagement with the disc adjacent to the outer jacket.

9. The method of claim 7, wherein the heat energy applied to the heat shrinkable plastic tube is effective to cause a portion of the inner surface of the heat shrinkable plastic tube to become disposed in compressive engagement with a portion of the outer surface of the disc and to provide a water blocking seal between a portion of the inner surface of the heat shrinkable plastic tube and a portion of the outer surface of the outer jacket and to provide a water blocking seal between a portion of the inner surface of the heat shrinkable plastic tube and the outer surface of the disc.

* * * * *